US008397657B2

(12) United States Patent
Guerrero et al.

(10) Patent No.: US 8,397,657 B2
(45) Date of Patent: Mar. 19, 2013

(54) VERTICAL GLIDER ROBOT

(75) Inventors: Julio Guerrero, Cambridge, MA (US);
Franz Hover, Somerville, MA (US);
Charles Ambler, Miami, FL (US);
Brooks Reed, Cambridge, MA (US);
Robert Hummel, Cambridge, MA (US)

(73) Assignees: Schlumberger Technology Corporation, Sugar Land, TX (US);
Massachusetts Institute of Technology, Cambridge, MA (US)

( * ) Notice: Subject to any disclaimer, the term of this patent is extended or adjusted under 35 U.S.C. 154(b) by 187 days.

(21) Appl. No.: 12/871,433

(22) Filed: Aug. 30, 2010

(65) Prior Publication Data

US 2012/0067268 A1 Mar. 22, 2012

Related U.S. Application Data

(60) Provisional application No. 61/289,722, filed on Dec. 23, 2009.

(51) Int. Cl.
*B63G 8/00* (2006.01)
(52) U.S. Cl. ............ 114/312; 114/121; 114/152
(58) Field of Classification Search ............ 114/312, 114/321, 330, 331, 332, 333, 337, 121, 144 R, 114/152, 338; 441/2; 73/170.34; 367/99
See application file for complete search history.

(56) References Cited

U.S. PATENT DOCUMENTS

| 3,454,083 | A | | 7/1969 | Brooks |
| 3,643,736 | A | | 2/1972 | Talley, Jr. |
| 3,774,564 | A | | 11/1973 | Bondon et al. |
| 4,777,819 | A | * | 10/1988 | Hoyt et al. ............ 73/170.34 |
| 5,069,580 | A | | 12/1991 | Herwig et al. |
| 5,074,713 | A | | 12/1991 | Reis |
| 5,370,074 | A | * | 12/1994 | Knudsen et al. ............ 114/312 |
| 6,113,312 | A | | 9/2000 | Nørholmen |
| 6,625,083 | B2 | | 9/2003 | Vandenbroucke |
| 6,786,087 | B2 | * | 9/2004 | Desa et al. ............ 73/170.34 |
| 6,808,021 | B2 | | 10/2004 | Zimmerman et al. |
| 2009/0114140 | A1 | | 5/2009 | Guerrero et al. |
| 2009/0241826 | A1 | | 10/2009 | Vosburgh et al. |

FOREIGN PATENT DOCUMENTS

| JP | 2007276609 A | 10/2007 |
| WO | 03070565 A2 | 8/2003 |

OTHER PUBLICATIONS

International Search Report of PCT Application No. PCT/US2010/061520 dated Aug. 25, 2011: pp. 1-3.
Byron et al., "Designing a Vertical / Horizontal AUV for Deep Ocean Sampling," Oceans, 2007: pp. 1-10.
Eriksen et al., "Seaglider: A Long-Range Autonomous Underwater Vehicle for Oceanographic Research," IEEE Journal of Oceanic Engineering, Oct. 2001, vol. 26(4): pp. 424-436.

(Continued)

*Primary Examiner* — Lars A Olson
(74) *Attorney, Agent, or Firm* — Bridget Laffey; Rachel Greene; Jakub Michna

(57) ABSTRACT

A subsea vertical glider robot which supports deployment in subsea oilfield activities is disclosed. This vertical glider robot can also be used in oceanographic research exploration. One application of this vertical glider robot is the autonomous delivery of equipment and sensor systems to a precise predetermined location on the sea floor. The vertical glider robot is deployed from a surface ship or any other suitable sea surface platform and allowed to free fall to the bottom of the ocean. The traversal through the body of water is performed primarily by converting initial potential energy of the apparatus into kinetic energy, it does not use propellers. The traversing of the seafloor is controlled with a steering module that refines orientation while processing information about the vertical glider robot's current position and the target where it has to land.

40 Claims, 8 Drawing Sheets

OTHER PUBLICATIONS

Pfannkuche et al., "GEOMAR Landers as Long-Term Deep-Sea Observatories," Sea Technology, Sep. 2003: pp. 1-5 (50, 52-55).

Prestero, "Verification of a Six-Degree of Freedom Simulation Model for the REMUX Autonomous Underwater Vehicle," Masters Thesis, Sep. 2001: pp. 1-128.

Priede et al., "Scavenging Deep Demersal Fishes of the Porcupine Seabright, North-East Atlantic: Observations by Baited Camera, Trap and Trawl," J. mar. biol. Ass. U.K., 1994, vol. 74(3): pp. 481-498.

Priede et al., "Autonomous Deep-Ocean Lander Vehicles: Modular Approaches to Design and Operation," OCEANS IEEE 1998 Conference Proceedings, 1998, vol. 3: pp. 1238-1244.

Sherman et al., "The Autonomous Underwater Glider 'Spray,'" IEEE Journal of Oceanic Engineering, Oct. 2001, vol. 26(4): pp. 437-446.

Webb et al., "SLOCUM: An Underwater Glider Propelled by Environmental Energy," IEEE Journal of Oceanic Engineering, Oct. 2001, vol. 26(4): pp. 447-452.

* cited by examiner

VERTICAL GLIDER ROBOT

CROSS-REFERENCE TO RELATED APPLICATION

This patent application claims the benefit of U.S. Ser. No. 61/289,722, filed Dec. 23, 2009, which is incorporated by reference herein.

FIELD OF THE INVENTION

The present invention relates to the field of oil exploration operations in a subsea environment. More specifically, the invention relates to an apparatus and method for supporting deployment of equipment or sensors on the sea floor of areas where oilfield exploration or oceanographic activities occur.

BACKGROUND OF THE INVENTION

In order to recover natural resources from underwater subterranean formations it is often necessary to perform exploration, monitoring, maintenance and construction operations on or beneath the sea floor. In relatively shallow depths these tasks can be performed by divers. However, at greater depths, and also when conditions are dangerous at shallow depths, the tasks are generally performed by robotic devices. Various types of robotic devices are known. For example, a remotely operated vehicle (ROV) is a robotic device that functions under the control of an operator via an umbilical cable that connects the ROV with a surface ship. A somewhat similar device, known as an autonomous underwater vehicle (AUV), operates according to programming, without physical connection to a surface ship. Hybrid ROVs which can operate either autonomously or via a physical connection to a surface ship are also known. Generally, ROVs are characterized by relatively limited range because of the physical connection to the surface ship. However, an ROV can operate indefinitely because energy is supplied by the surface ship. ROVs traverse the subsea environment using propellers which are powered with energy transmitted through the umbilical cords. AUVs are not range-limited by a physical connection to the surface, but cannot operate indefinitely because they tend to exhaust their storage batteries quickly, necessitating frequent trips to the surface for recharging. Another difference is that ROVs exchange data and commands with the surface ship via the umbilical cable, whereas AUVs exchange data and commands via wireless communications, or store data in hardware while they are submerged. In some cases, the hardware storing the data is picked up at the sea surface. AUVs carry batteries which power their propellers, carry a minimal payload and navigate only certain distances.

A further underwater vehicle, known as a glider have no embedded propulsion system, but have the ability to change buoyancy, enabling gradual ascent or descent. Energy is carried by the glider to open and close a pump which allows water in or out of the glider thus changing the buoyancy of the glider. Gliders are unable to carry payloads other than their own weight.

While ROVs, AUVs, HROVs and Gliders are capable of performing tasks which cannot be practically performed in a cost-effective manner by divers, the energy to traverse the media is carried by the vehicle or transmitted to it via a cable (ROV). Traversing of the media is carried out in ROVs, AUVs and HROVs using propellers or in the case of gliders by modifying their buoyancy. There is a need for a vertical glider robot to carry a minimum amount of energy to power only its instrumentation, but not to power its locomotion, thus improving the cost-effectiveness of these devices.

Considerable research has been done on the problems associated with recovery of undersea resources. The following are some examples. U.S. Pat. No. 3,643,736 entitled SUB SEA PRODUCTION STATION describes production of sub sea deposits through a satellite system. The system is not configured to support autonomous operations. U.S. Pat. No. 3,454,083 entitled FAIL-SAFE SUBSEA FLUID TRANSPORTATION SYSTEM describes a system for production of fluid minerals. The system includes a product gathering network having production satellites in which the gas-oil water ratios of each well are periodically tested and the flow rates are automatically controlled. U.S. Pat. No. 6,808,021 B2, entitled SUB SEA INTERVENTION SYSTEM, describes a system that is usable within sub sea wells that extend beneath the sea floor, including a station that is located on the sea floor and an underwater vehicle. The underwater vehicle is housed in the station and is adapted to service the subsea wells.

SUMMARY

In accordance with some embodiments an apparatus for traversing a body of water is provided. A perception system is adapted to gather navigation information; and a steering system is adapted to autonomously steer the apparatus while traversing the body of water from a first location towards a second location. The apparatus is adapted to maintain a substantially constant density during the traversing of the body of water. According to some embodiments, the first and second location is at the water surface and second location a predetermined location on the sea floor. The apparatus can be substantially negatively buoyant such that the apparatus falls through the body of water towards the floor of the body of water. According to other embodiments, the apparatus traverses from the sea floor to the surface, in which case the apparatus is substantially positively buoyant such that the apparatus rises through the body of water toward the surface. The apparatus can include one or more releasable high-density members adapted to be released from the apparatus thereby causing the apparatus to change from substantially negatively buoyant to substantially positively buoyant.

According to some embodiments the perception system includes a communication system adapted to communicate with a device that monitors a direction and/or location of the apparatus. The device can be located on the surface, and the perception system can include an acoustic transceiver adapted to transmit an acoustic pulse detectable by the device such that the device and the acoustic transceiver form an underwater acoustic positioning system. In embodiments, the apparatus is adapted to autonomously deliver equipment to the second location on a floor of the body of water.

According to some embodiments a method for traversing a body of water with an apparatus is provided that includes placing the apparatus in the body of water, perceiving navigation information by the apparatus, steering the apparatus in part using the navigation information so as to traverse the body of water from a first location to a second location, and maintaining a substantially constant density of the apparatus during the traversing of the body of water.

An advantage of at least some embodiments is a vertical glider robot which requires significantly less energy for traversing the subsea environment. The only energy the vertical glider robot requires to carry in a stored manner is the energy to operate its electronics and controls. The energy necessary to propel the vertical glider robot through a subsea environment is obtained by transforming the vertical glider robots potential energy into kinetic energy as the vertical glider robot free falls through the subsea environment and the vertical glider robot reaches the target location by steering as the vertical glider robot free falls.

Further features and advantages will become more readily apparent from the following detailed description when taken in conjunction with the accompanying Drawings.

DETAILED DESCRIPTION

Figure 1:
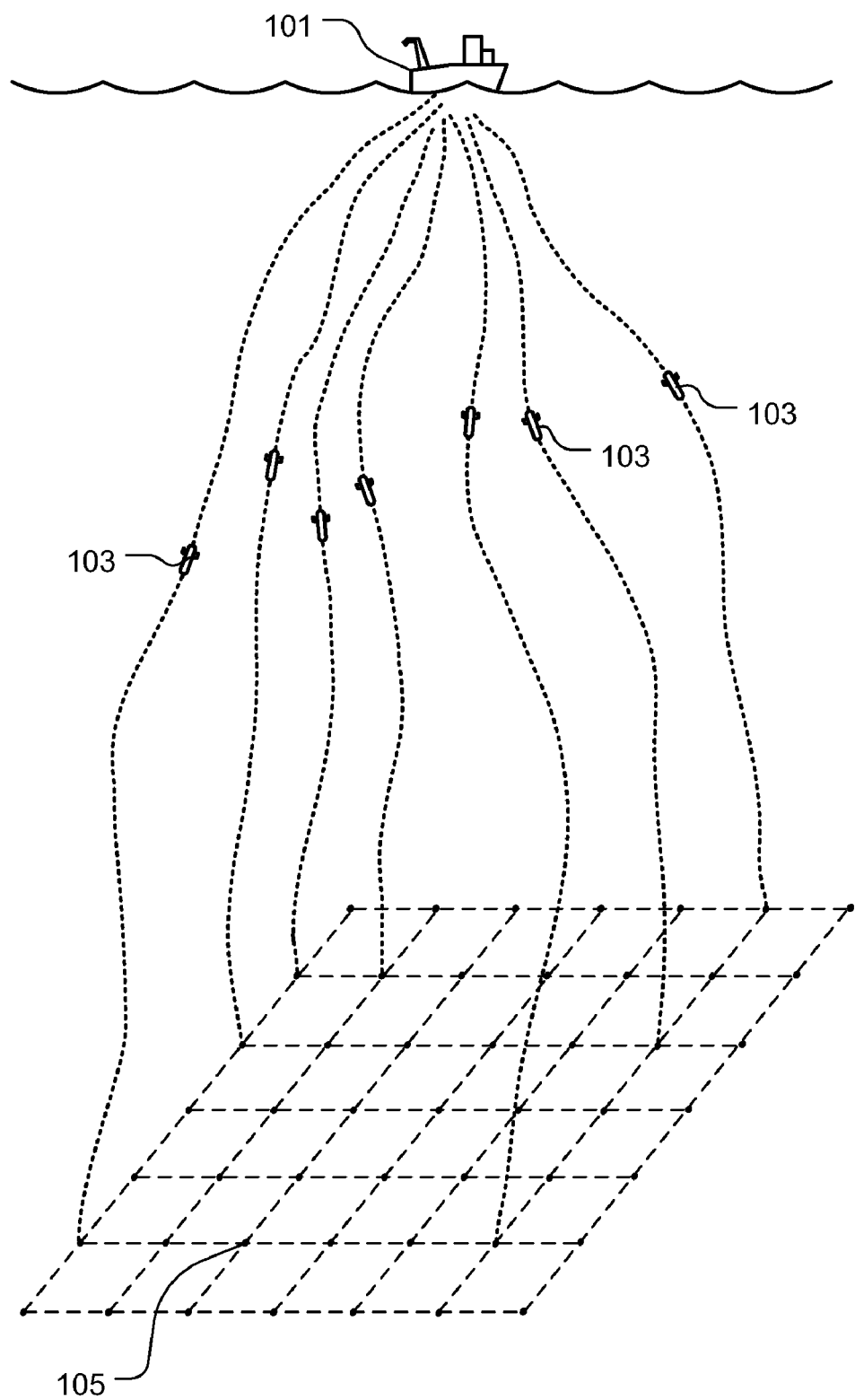
FIG. 1 illustrates deployment of several vertical glider robots, according to some embodiments.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

A subsea vertical glider robot which supports deployment in subsea oilfield activities is disclosed. This vertical glider robot can also be used in oceanographic research exploration. One important application of this vertical glider robot is the autonomous delivery of equipment and sensor systems to a precise predetermined location on the sea floor. Equipment and sensor systems can be deployed from surface vessels positioned kilometers over the target. The vertical glider robot is deployed from a surface ship or any other suitable sea surface platform and allowed to free fall to the bottom of the ocean. The traversing of the water column or undersea is controlled with a steering module that refines orientation while processing information about the vertical glider robot's current position and the target where it has to land. Methods of dropping the vertical glider robot are used in oceanographic experiments with landers. Landers are used to study fish behavior and population patterns and are also used to capture fish and bring these fish to the sea surface. Landers are also used to investigate the water currents near the ocean floor. See Pfannkuche et al., "GEOMAR landers as long-term deep-sea observatories", Sea Technology, 44(9):50-55, 2003. Landers are designed primarily as stationary objects and do not employ control or navigational systems. Some landers may have surveying and retrieval abilities; see Priede et al.; "Autonomous deep-ocean lander vehicles; modular approaches to design and operation. OCEANS '98 Conference Proceedings, pages 1238-1244, Vol. 3, 1998.

FIG. 1 illustrates a plurality of vertical glider robots operable to support performance of autonomous and semi-autonomous tasks associated with exploration, monitoring, maintenance and construction operations both nearby and beneath the sea floor. In the illustrated embodiment, the system includes a sea surface vehicle 101, a plurality of vertical glider robots (VGR) 103 and the sea floor target grid 105. The vertical glider robots 103 are autonomous and once deployed will not have any connection via an umbilical cord to the sea surface vehicle 101. The vertical glider robot 103 can be used to support deployment of equipment, sensors, itself, or other devices in subsea oilfield operations. The vertical glider robots can be deployed as one or a plurality of vertical glider robots 103 and can be deployed simultaneously or at predetermined time intervals between each other. The vertical glider robots 103 may be used for the autonomous delivery of equipment and sensor systems to predetermined locations on the sea floor e.g. a grid of targets 105.

Figure 2:
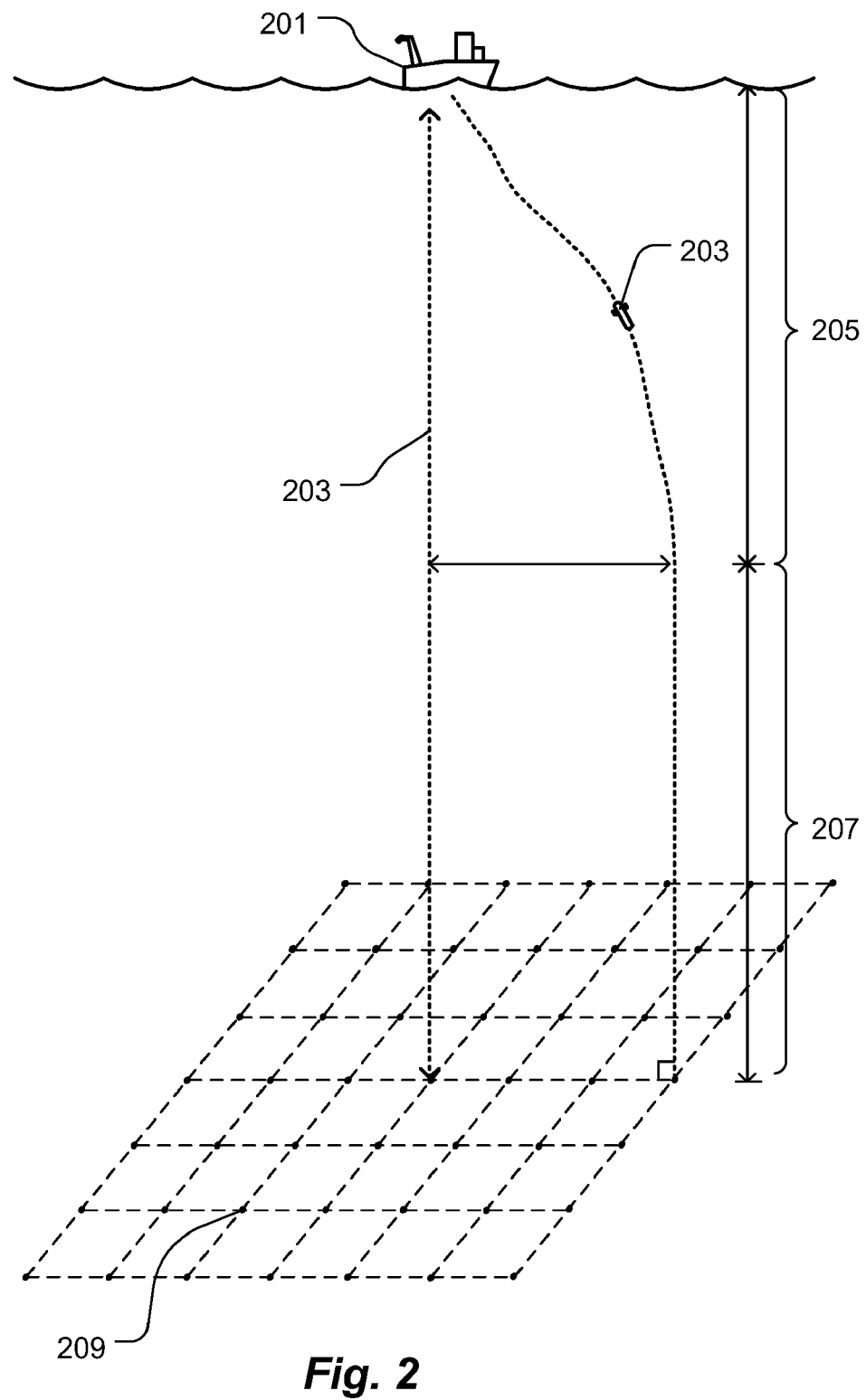
FIG. 2 illustrates a vertical glider robot during its deployment phase, according to some embodiments.

FIG. 2 illustrates a vertical glider robot during its deployment phase, according to some embodiments. Deployment of the vertical glider robot 203 from a sea surface vessel 201 has two phases before the vertical glider robot 203 reaches the sea floor target grid 209. Phase one is the Gliding Phase 205 and phase two is the vertical descending phase 207. During phase one the vertical glider robot 203 mostly glides while in the second phase the vertical glider robot 203 falls predominately vertically. The vertical glider robot 203 changes from phase one to phase two on reaching the correct depth. An advantage of this vertical glider robot 203 is how the vertical glider robot 203 reaches the sea floor target grid 209. The vertical glider robot 203 moves from the sea surface vessel 201 to the sea floor target grid 209 by free falling, being negatively buoyant, and controlled steering. The vertical glider robot 203 converts its initial potential energy into kinetic energy as it descends and utilizes a navigational control and actuation system to descend in the most efficient way to reach the sea floor target grid 209.

Figure 3:
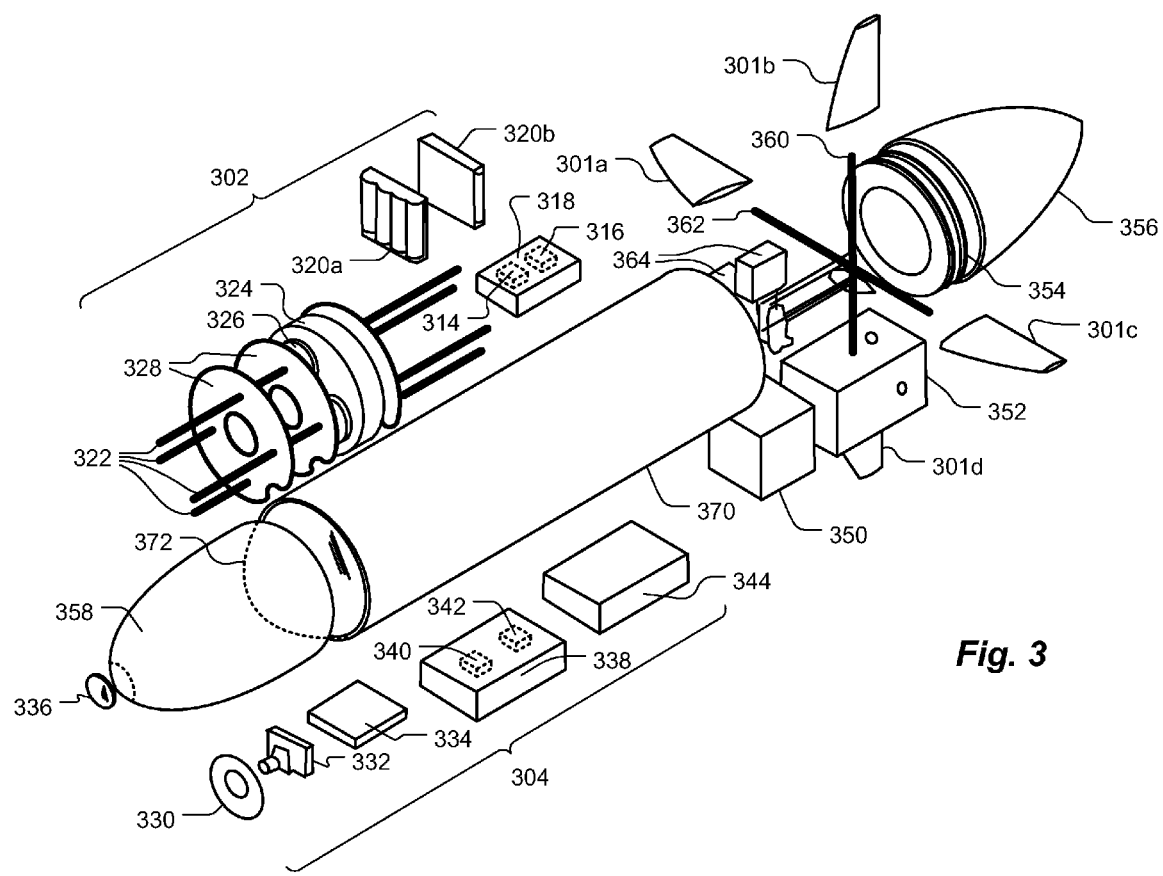
FIG. 3 illustrates further detail of a vertical glider robot which comprises a number of modules, according to some embodiments.

FIG. 3 illustrates further detail of a vertical glider robot which comprises a number of modules, according to some embodiments. A steering module which in one non-limiting example is a set of fins 301a, 301b, 301c and 301d, allows the vertical glider robot to orient towards a target. In one embodiment the fins define two steering planes. In order to align the axis of the vehicle with respect to the target, fine rotations of the fins modify the axis of the vehicle, thus enabling the vertical glider robot to change direction correctly and reach the intended target. The set of fins 301a, 301b, 301c and 301d, controls depth orientation and right to left orientation. In one non-limiting example, these fins are identified as rudder fins 301b and 301d and elevator fins 301a and 301c.

A control module 302, which processes what the perception module 304 has perceived as the current position of the vertical glider robot and based on this current position determines what commands to send to the steering module 301, which in turn realigns the vertical glider robot in order to reach a target. The control module 302 receives information from a perception module 304 and computes this information with respect to the target. The perception module 304 informs the control module of the location of the vertical glider robot and where the vertical glider robot is with respect to its target e.g. sea floor. Control module 302 includes a processing system 318 for carrying out calculations and processing using one or more processing units 314 and memory storage 316. Memory storage 316 can be in the form of magnetic storage, such as a hard disk, and/or in the form of solid-state memory such as flash memory, but is not limited to these two. Control module 302 also includes two battery packs 320a and 320b. According to some embodiments, each of the packs 320a and 320b include four size AA NiMH batteries. Module 302 also includes a lead weight 324 and a number of copper weights 326. Aluminum supports 328 and steel rods 322 are used to mount various components within the shell housing 370, which can be made of polycarbonate, according to some embodiments.

An enclosure module provides structural integrity and stability. In the example shown in FIG. 3, the enclosure is cylindrical. Each of these modules is attached to the chassis inside this cylindrical structure of the enclosure module which includes shell housing 370, tail cone 354, and nose cone 358. According to some embodiments, nose cone 358 is detachable and shell housing 370 is sealed at the forward end. According to such embodiments, the nose cone 358 is weighted such that the robot is negatively buoyant with cone 358 attached and positively buoyant with the nose cone 358 detached. According to some embodiments, the shape of shell housing 370 can be convex at the forward end such as shown by the broken line 372.

According to some embodiments, a perception Module 304 is provided which allows the vertical glider robot to know where it is at anytime. In this example, the perception module is composed of a camera 332, camera front mount 330, and a microcontroller and memory card 334 which allows the perception module to process the digital information collected by the camera 332. Nose cone 358 can include a viewport 336. The camera 332 may have a frame of the location of the vertical glider robot and has a target and the camera continuously sees the target moving in the frame so the perception module sends a command to the control module which in turn sends a command to the steering module to reorient and move in the correct direction towards the intended target.

According to some embodiments, perception module 304 includes navigation sensors 338 which includes roll-and-pitch compensated magnetic compass 340 and depth sensor 342.

According to some embodiments, perception module 304 includes a communication system 344, which is an acoustic device that can transmit and receive messages through water. According to some embodiments communication system 344 transmits acoustic pulses that are used by external navigation systems such as long-baseline (LBL) or ultra-short-baseline (USBL) arrays, as will be described in further detail below. According to such embodiments, communication system 344 is used to receive navigation information from external sources.

An actuation module includes one or a plurality of actuators. In the example shown in FIG. 3, the actuation system comprises two actuators 364. These two actuators 364 actuate fins 301a, 301b, 301c and 301d via axels 360 and 362 using linkages which can be for example four-bar linkage arms. The actuator 364 are mounted with servo mount 350, and the axels are mounted within axel mount 352. The fins, in turn, orient the vertical glider robot as it traverses from the sea surface vessel to the sea floor target grid and/or visa versa. For example, the vertical glider robot commands actuation of the fins to orient itself on route to the sea floor target grid 209 as shown in FIG. 2. The amount of actuation and therefore motion commanded to the fins is determined based on the current position of the vertical glider robot 203 and orientation with respect to the sea floor target grid 209. The vertical glider robot 203 will reorient itself as necessary in order to reach the sea floor target grid 209.

Many of the described embodiments overcome shortcomings of existing glider technology. Most applications to glider technology are developed for long term, long distance missions over an open ocean which take advantage of minimum power usage. These gliders cannot carry payloads or travel fast for vertical deployments. Many of the described embodiments overcome these shortcomings of existing glider technology.

According to some embodiments, the vertical glider robot uses acoustic ranging to navigate. Examples of underwater acoustic positioning systems that can be employed include long-baseline (LBL) systems, ultra-short-baseline (USBL) systems (also sometimes referred to as super short baseline (SSBL) systems), short baseline (SBL) systems, and GPS intelligent buoy (GIB) systems. The vertical glider robot according to these embodiments is equipped with a perception module which is a roll-and-pitch compensated magnetic compass, a depth sensor, and a communication module which is an acoustic device which can transmit and receive messages through water. The LBL or USBL assist navigation using acoustic ranging.

LBL entails triangulation similar to a Global Positioning System. With LBL a number of acoustic transducers are spread over a wide domain, e.g., dispersed on the ocean floor. Precise measurements of one or two-way travel times between these acoustic transducers and the moving vertical glider robot provides the acoustic ranges.

In USBL operations, the transducer array is compressed into a single compact instrument package. After the communication module transmits an acoustic pulse the LBL or USBL array can discriminate the direction of the vertical glider robot pulse's wave front to a precision of around one-tenth degree. The depth of the vertical glider robot can be encoded into the transmitted signal, so that the processing can then fully resolve Cartesian coordinates of the vertical glider robot.

The LBL or USBL array end may also send an interrogation signal, to which the vertical glider robot responds, providing a two-way travel time and range measurement to the LBL or USBL. In this case, the down-going interrogation signal can encode the calculated vertical glider robot position, to enable feedback control. The control is performed inside the vertical glider robot with the information received from the USBL. Note that according to these embodiments, the USBL does not control the vertical glider robot, it only tells it where it is and where it is going. The vertical glider robot processes that information to decide and command its direction by itself internally. USBL is a preferred navigational system in some situations where the time and cost of deploying and calibrating an LBL system is excessive.

Figure 4A:
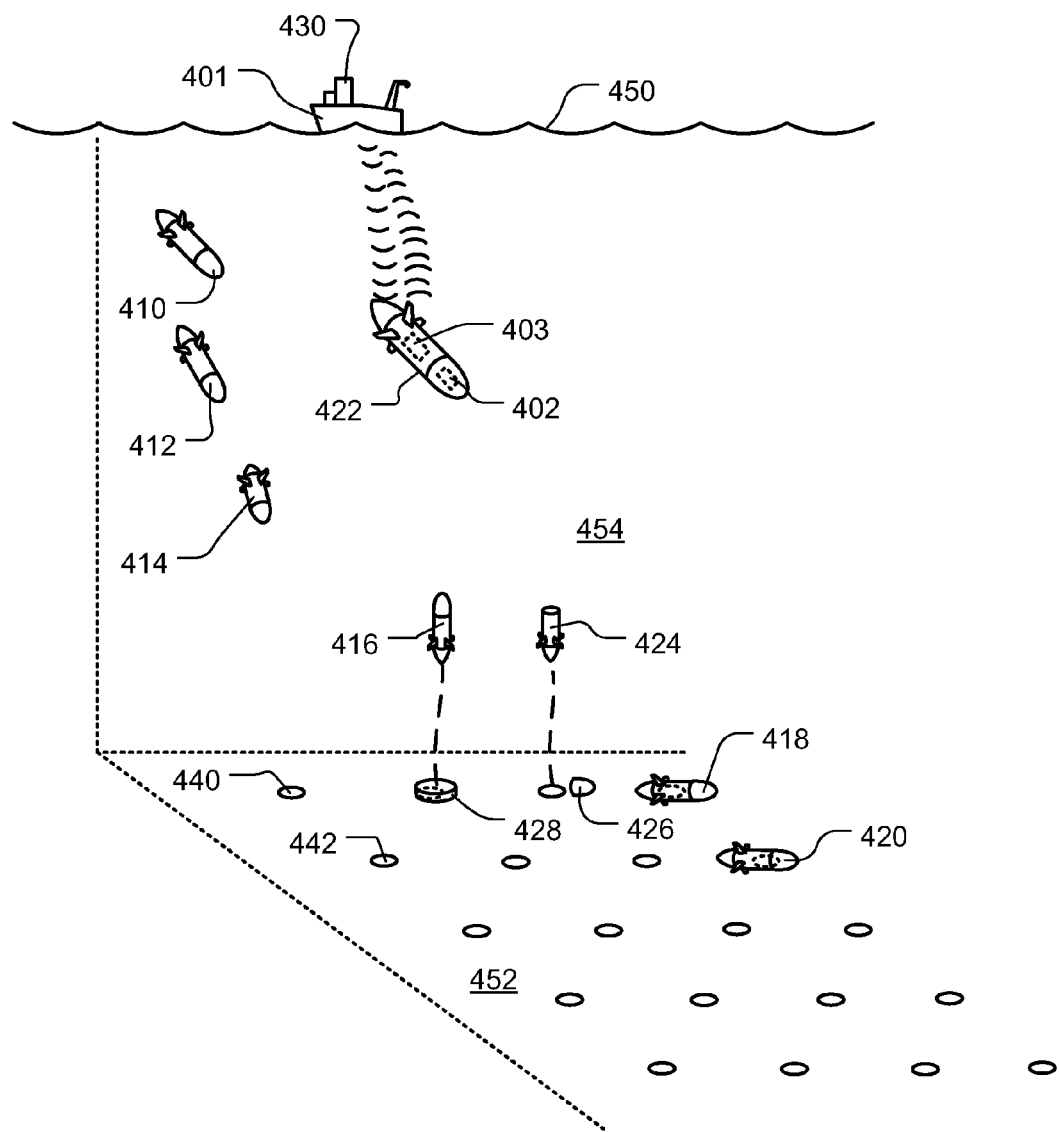
FIG. 4A illustrates the deployment of vertical glider robots using an ultra-short-baseline array, according to some embodiments.
Figure 4B:
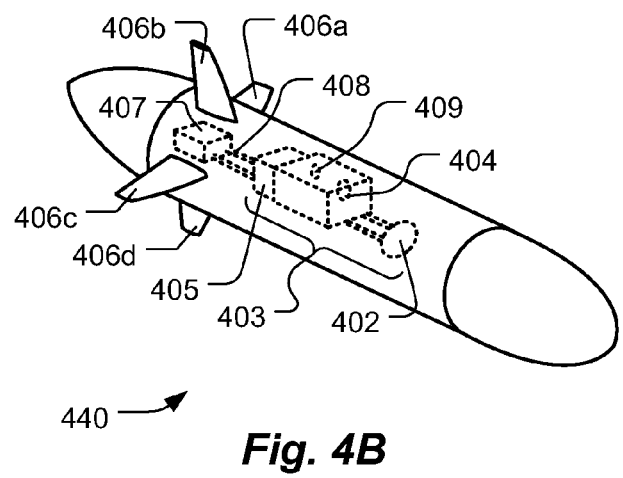
In FIG. 4B illustrates further detail of a vertical glider robot, according to some embodiments.

FIGS. 4A and 4B illustrates the deployment of vertical glider robots using an ultra-short-baseline (USBL) array, according to some embodiments. In FIG. 4A, the USBL 430 is located on the sea surface vessel 401 on the sea surface 450. USBL 430 communicates with the vertical glider robots such as robot 422. Also shown in FIG. 2 are vertical glider robots 410, 412, 414, 416, 418, 420 and 424. Signals can be transmitted from the USBL 430 to the vertical glider robots and from the vertical glider robots to the USBL 430. Robots 410, 412, 414 and 422 are shown in the process of descending through sea water 454 towards a matrix of targets, such as targets 440 and 442 on sea floor 452. Robots 418 and 420 are shown anchored on the sea floor, having reached their respective sea floor targets. Robots 416 and 424 are shown ascending through the sea water 454 towards the surface 450.

According to some embodiments, the robots return from to the surface via releasing a concentrated weight. Robot 416 is shown returning to the surface after releasing weight 428. According to some embodiments, the nose cone of the robot is used as the releasable weight. Robot 242 is shown returning to the surface after releasing nose cone 426, thereby becoming positively buoyant.

Fig. 4B illustrates further detail of a vertical glider robot, according to some embodiments. Vertical glider robot 440 includes a perception module 403. The perception module 403 includes an acoustic device 405 which transmits and receives messages through the water. The perception module 403 also comprises a depth sensor 409 and a roll and pitch-compensated magnetic compass 404. The vertical glider robot 440 also has a steering module that includes fins 406a, 406b, 406c and 406d, an actuation module 407, a chassis 408. According to some embodiments, perception module 403 includes a separate communication module 402 that is used to communicate signals from the USBL to the vertical glider robot and from the vertical glider robot to the USBL. The communication module 402 may also be used to communicate signals from an LBL.

Figure 5B:
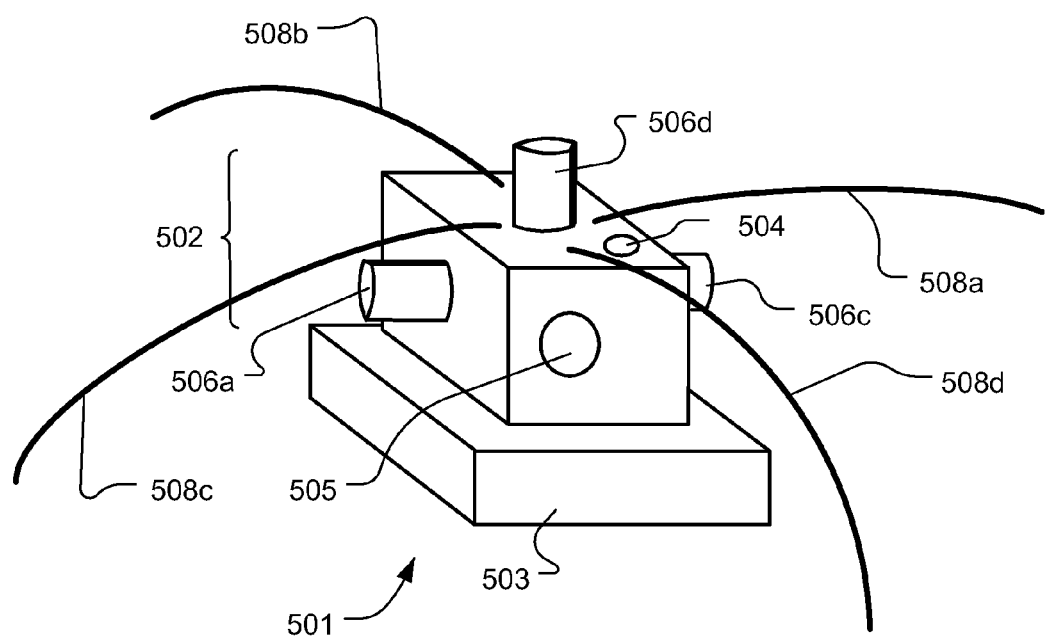
FIG. 5B illustrates further detail of a vertical glider robot, according to some embodiments.
Figure 5A:
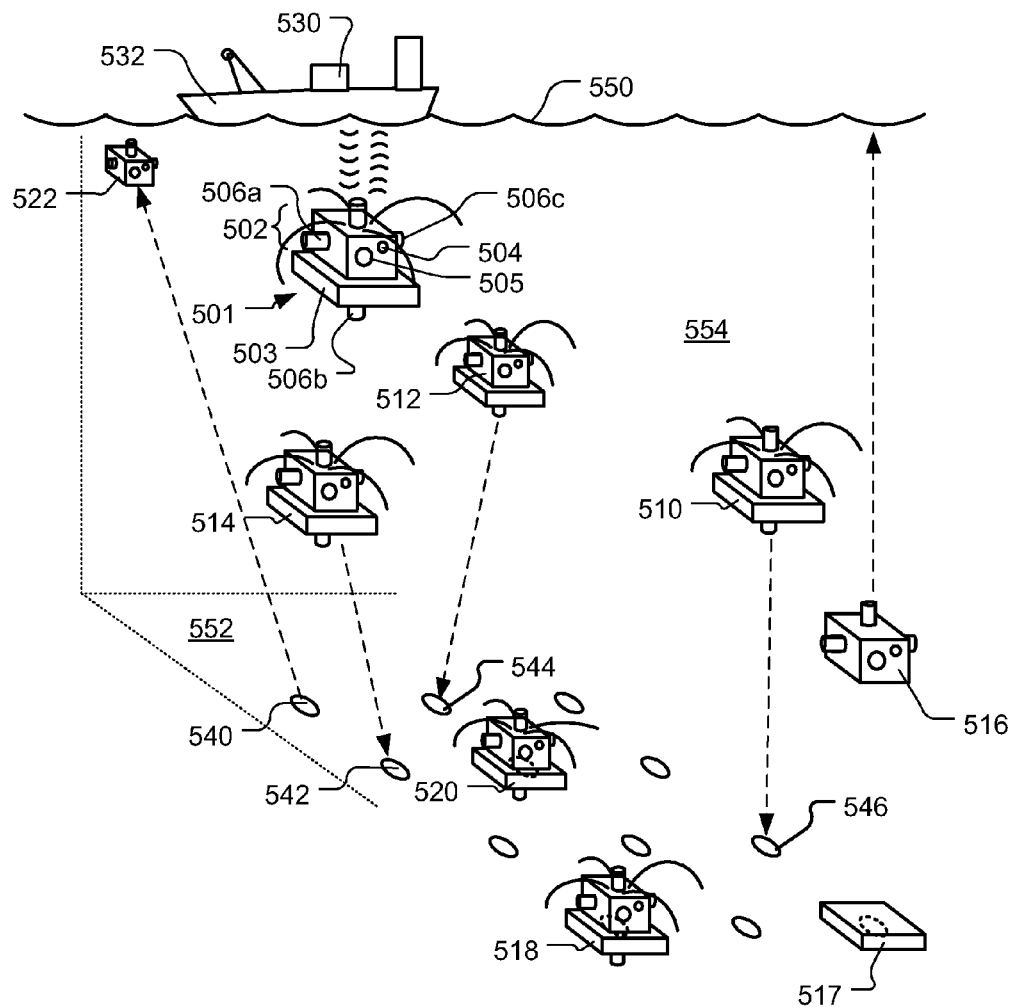
FIG. 5A illustrates the deployment of vertical glider robots, according to some embodiments.

FIG. 5A illustrates the deployment of vertical glider robots, according to some embodiments. The vertical glider robot 501 has an EM Sensor Unit 502 which includes electrode arms that contact the sea floor. According to some embodiments, the EM sensor unit 502 is similar to the sea floor electromagnetic receiver manufactured by WesternGeco, a business segment of Schlumberger. According to some embodiments a concentrated weight 503 is used to anchor the vertical glider robot 501 to the sea floor. According to some embodiments other mechanical and anchoring systems which allow the vertical glider robot 501 to grip and anchor to the sea floor can be used such as: arms with gripping ends; and/or spikes that expand as they are introduced or pushed into the sea floor by the VGR weight. The anchoring systems or mechanical systems, according to some embodiments, are released to allow the vertical glider robot 501 return to the sea surface. According to some embodiments the payload of the robot 501 is the EM sensor unit 502 is deposited on the sea floor with portions of the vertical glider robot 501 returning to the sea surface to obtain a further payload for deployment in another target.

In FIG. 5A, a number of vertical glider robots 501, 510, 512, 514, 516, 518, 520 and 522 are deployed into the sea 554 from vessel 532 on sea surface 550. The robots 501, 510, 512 and 514 are shown traversing the sea 554 towards targets on the sea floor 552. In particular, robots 510, 512 and 514 are traversing towards sea floor targets 546, 544 and 542 respectively. According to some embodiments, the sea floor targets are distributed on the sea floor 552 in a regular grid pattern. The robots include communication module 504 includes an acoustic device which transmits and receives messages through the water, for example to communicate with other robots and/or the surface vessel 532. According to some embodiments the communication module 504 is used to communicate signals from the USBL 530 to the vertical glider robots and from the vertical glider robots to the USBL 530. According to some embodiments, the communication module 504 may also be used to communicate signals from an LBL. The steering module that includes fins 506a, 506b and 506c are used to steer the robot as it traverses through the water 554 toward the sea floor 552 while it is negatively buoyant, or toward the surface 550 while it is positively buoyant. The robots also include a perception module 505 that can include a compass and depth sensor, according to some embodiments. The robots 518 and 520 are shown anchored on targets on sea floor 552. Robots 516 and 522 are shown traversing the sea 554 towards the surface 550 after releasing an anchoring device. For, example, in the case of robot 516, the concentrated weight 517 has been released that results in robot 516 becoming positively buoyant.

According to some embodiments, the EM sensor units are used as sea floor receivers in a controlled source electromagnetic survey, such as the Controlled Source Electromagnetics survey provided by WesternGeco in which a low-frequency electromagnetic field is transmitted using a deep-towed electric dipole antenna (source), and the resulting field is sampled at the seafloor using the deployed EM sensor units as shown in FIG. 5A.

FIG. 5B illustrates further detail of a vertical glider robot, according to some embodiments. The robot 501, includes a steering module that includes fins 506a, 506c and 506d for steering the robot 501 as it traverses through the water. A perception module 505 can include a compass and depth sensor, according to some embodiments. Robot 501 includes communication module 504 that uses an acoustic device to transmits and receives messages through the water, for example to communicate with other robots and/or a surface vessel. According to some embodiments the communication module 504 is used to communicate signals from the USBL and or LBL on the surface for navigational purposes as described elsewhere herein. According to some embodiments, the EM sensor unit 502 is a five-component receiver, which includes three electric field sensors along with two horizontal magnetic field sensors. Electric field sensor arms 508a, 508b, 508c and 508d are shown in FIG. 5B. According to some embodiments, the EM sensor unit 502 is preprogrammed prior to deployment by means of computer and GPS synchronization. The EM sensor unit 502 records time series data and store these data on a data storage device inside sensor unit 502.

Figure 6:
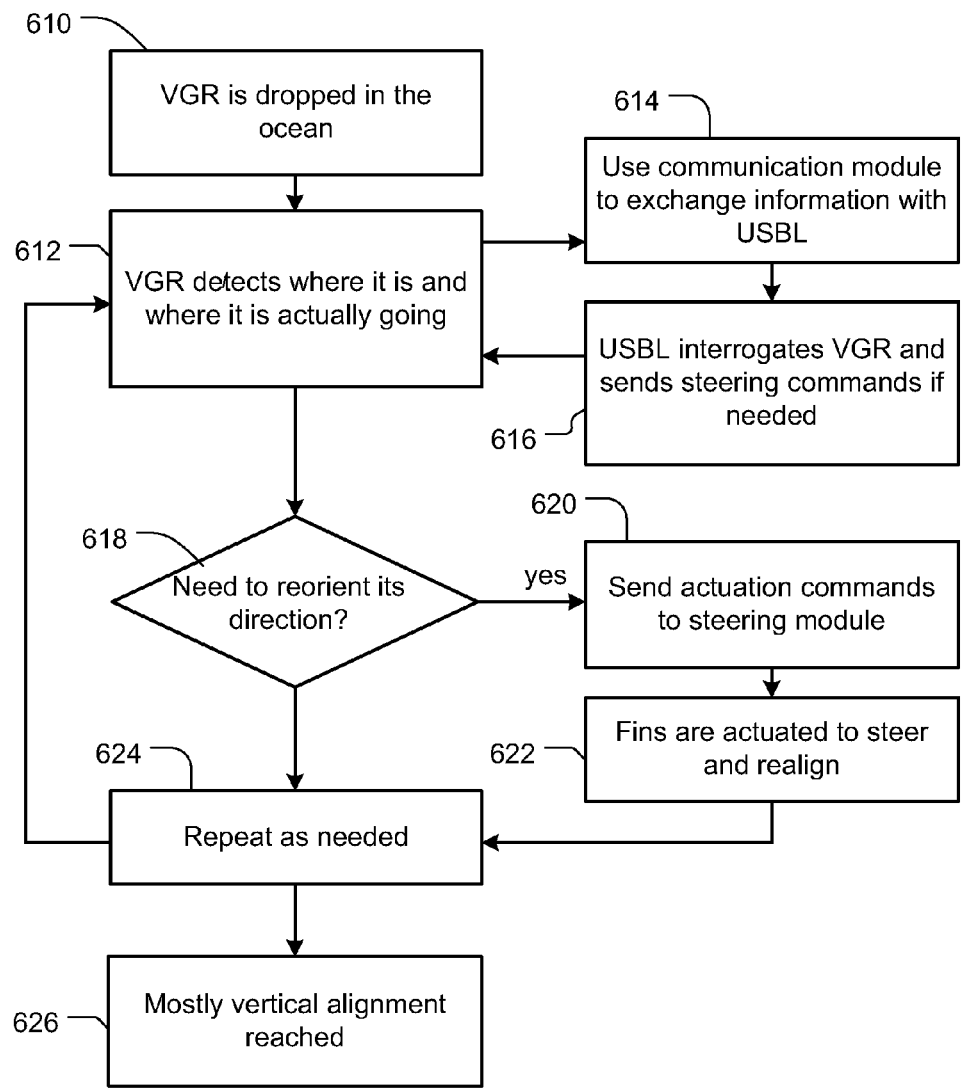
FIG. 6 is a flowchart illustrating steps for deploying a vertical glider robot, according to some embodiments.

FIG. 6 is a flowchart illustrating steps for deploying a vertical glider robot (VGR), according to some embodiments. The method comprises dropping a VGR from a sea surface vehicle into a body of water (step 610). According to some embodiments, the body of water is an ocean. The method further comprises the VGR detecting where it is and where it needs to go in order to reach the designated target (step 612). According to some embodiments the VGR uses a compass and a depth sensor for detection purposes. According to some embodiments, the VGR uses a camera to aid in navigation. According to some preferred embodiments, the VGR communicates with a USBL located on the sea surface vessel (step 614). The USBL interrogates the VGR and sends steering commands to the VGR if necessary (step 616). In step 618, a decision is made if the VGR requires reorientation of direction. The VGR reorients its direction if necessary by sending actuation commands to a steering module (step 620). According to some embodiments, fins are actuated to steer and realign the VGR (step 622). The VGR uses a communication module to exchange information with the USBL. In step 624, the method further comprises repeating the steps of detecting (steps 612, 614 and 616) in order to reach the designated target and reorienting the direction if necessary (steps 618, 620 and 622) until it aligns with ideal target and reaches mostly vertical alignment with the target (step 626).

Figure 7:
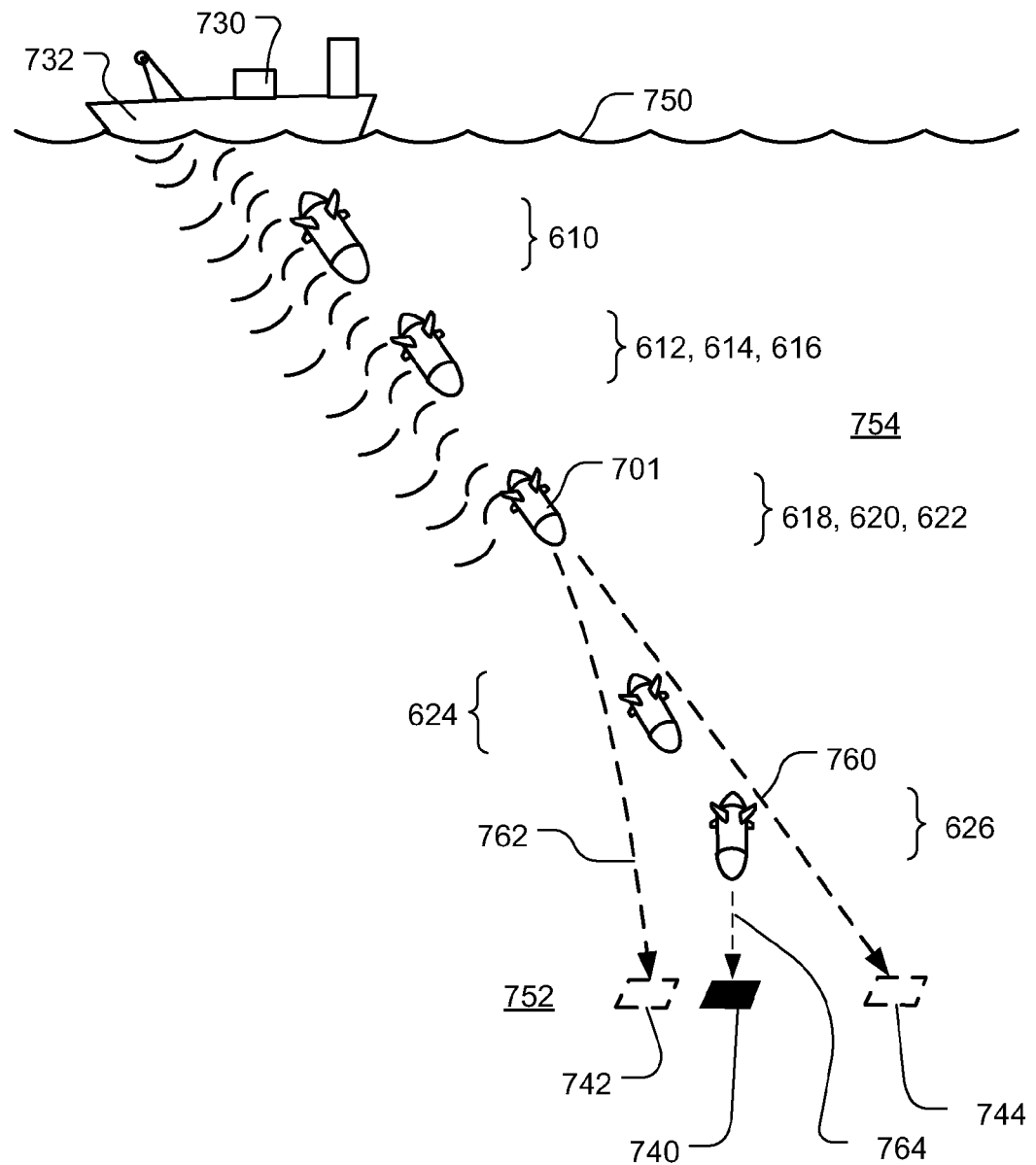
FIG. 7 illustrates the process of deployment of a vertical glider robot towards a sea floor target, according to some embodiments.

FIG. 7 illustrates the process of deployment of a vertical glider robot towards a sea floor target, according to some embodiments. The robot 701 is deployed from vessel 732 on the sea surface 750 into the sea 754. The robot 701 is being directed toward the ideal target 740 on the sea floor 752. The deployment form the vessel corresponds to step 610 in FIG. 6. Robot 701 detects where it is and where is actually going, which corresponds to steps 612, 614 and 616 in FIG. 6. If robot 701 perceives the need to reorient its direction it sends actuation commands to a steering module, which corresponds to steps 618, 620 and 622 in FIG. 6. Broken arrow 760 is the path that the robot would have followed, toward a location 744, as a result of the initial detection steps 612, 614 and 616. Broken arrow 762 is the path that the robot would have followed toward a location 742 after the reorientation steps 618, 620 and 622. The detection and reorientation steps are repeated if necessary, which corresponds to step 624 in FIG. 6. The broken arrow 764 is the path towards the ideal target 740 after the robot has reached its mostly vertical alignment, which corresponds to step 626 in FIG. 6.

According to some embodiments a large number of vertical glider robots are deployed simultaneously using an approach to overcoming limitations inherent in utilizing an acoustic environment. For USBL operations in particular, even with overlapping timing periods ("ping stacking"), only a subset of the incoming signals from the vertical glider robot could reasonably be detected and properly associated. According to some embodiments, deploying a large number of vertical glider robots simultaneously an algorithm is selected to overcome the real-time decision problem for control based on which targets need to be tracked and which can proceed without USBL hits. This algorithm selection is based primarily on the position uncertainties of the set of vertical glider robots, and their expected errors relative to the desired landing locations. According to some embodiments, the algorithm operates in the following manner: a vertical glider robot with small uncertainty and small error will likely hit the target without further USBL hits, and very little control action; a vertical glider robot with small uncertainty and large error needs to take control action but requires fewer USBL hits; and a vertical glider robot with large uncertainty may or may not hit the target, and is therefore in need of better position information via the USBL.

According to some embodiments, the vertical glider robots as described herein are used in combination with the techniques described in United States Patent Application Publication No. US2009/0114140 A1, published on May 7, 2009 (hereinafter "the '140 publication") which is incorporated herein by reference. For example, according to some embodiments the robots described herein are used to charge and/or discharge stored energy, use and/or provide communication links as described the '140 publication. According to some embodiments, the robots as described herein are used for data exchange and for other tasks as described in the '140 publication. For example, according to some embodiments, vertical glider robots as described herein are used in a subsea garage setting to: deploy sensors for subsea oil exploration surveillance; and/or to deploy data hubs that would collect information from subsea activities, which would be transmitted to them wireless or by some other means from nearby subsea garage systems.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. An untethered autonomous apparatus for traversing a body of water comprising:
   a perception system inside an enclosure module adapted to gather navigation information;
   a steering system including a plurality of actuable fins adapted to autonomously steer the apparatus while traversing the body of water from a first location towards an second location, wherein the untethered autonomous apparatus is adapted to maintain a substantially constant density during the traversing of the body of water; and
   wherein the perception system includes a camera and a processing system adapted to aid in navigation of the untethered autonomous apparatus.

2. An untethered autonomous apparatus according to claim 1 wherein the second position is predetermined, and one of the first and second location is at or near a water surface and the other of the first and second location is at or near a floor of the body of water.

3. The untethered autonomous apparatus of claim 2 wherein the predetermined location is one of a plurality of locations distributed on the floor of the body of water in a grid pattern.

4. The untethered autonomous apparatus of claim 2 wherein the untethered autonomous apparatus anchors to the floor of the body of water.

5. An untethered autonomous apparatus according to claim 1 wherein the first location is at or near a water surface and the second location is at or near a floor of the body of water, and wherein the untethered autonomous apparatus is substantially negatively buoyant such that the untethered autonomous apparatus falls through the body of water towards the floor of the body of water.

6. An untethered autonomous apparatus according to claim 1 wherein the first location is at or near a floor of the body of water and the second location is at or near a water surface, and wherein the untethered autonomous apparatus is substantially positively buoyant such that the untethered autonomous apparatus rises through the body of water toward the surface of the body of water.

7. An untethered autonomous apparatus according to claim 1 further comprising one or more releasable high-density members adapted to be released from the untethered autonomous apparatus thereby causing the untethered autonomous apparatus to change from substantially negatively buoyant to substantially positively buoyant.

8. An untethered autonomous apparatus according to claim 7 wherein the one or more releasable high-density members includes a detachable nose member.

9. An untethered autonomous apparatus according to claim 1 wherein the first and second location are separated by more than about 1 kilometer in vertical distance.

10. An untethered autonomous apparatus according to claim 1 wherein a substantial portion of the traversing is in primarily a vertical direction.

11. An untethered autonomous apparatus according to claim 1 wherein the perception system includes a communication system adapted to communicate with a device that monitors a direction and/or location of the untethered autonomous apparatus.

12. An untethered autonomous apparatus according to claim 11 wherein the device that monitors a direction and/or location of the untethered autonomous apparatus is located on the surface of the body of water.

13. An untethered autonomous apparatus according to claim 12 wherein the perception system includes an acoustic transceiver adapted to transmit an acoustic pulse detectable by the device.

14. An untethered autonomous apparatus according to claim 13 wherein the device and the acoustic transceiver form at least part of an underwater acoustic positioning system.

15. An untethered autonomous apparatus according to claim 14 wherein the underwater acoustic positioning system is of a type selected from a group consisting of: long-baseline, ultra-short-baseline, super short baseline, short baseline, and GPS intelligent buoys.

16. An untethered autonomous apparatus according to claim 1 wherein the perception system includes a compass and/or a depth sensor.

17. An untethered autonomous apparatus according to claim 1 wherein the untethered autonomous apparatus is adapted to autonomously deliver equipment to the second location on a floor of the body of water.

18. An untethered autonomous apparatus according to claim 17 wherein the equipment includes one or more types of equipment selected from a group consisting of: sensors, valves, and completion components.

19. An untethered autonomous apparatus according to claim 1 further comprising an electromagnetic sensor system adapted to make electromagnetic measurements at or near a floor of the body of water.

20. The untethered autonomous apparatus according to claim 1 wherein the plurality of actuatable fins are actuated with one or a plurality of actuators.

21. A method for traversing a body of water with an untethered autonomous apparatus comprising:
    placing the untethered autonomous apparatus in the body of water;
    perceiving navigation information by the untethered autonomous apparatus using a perception system inside an enclosure module which includes a camera and a processing system adapted to aid in navigation of the untethered autonomous apparatus;
    steering the untethered autonomous apparatus in part using the navigation information and a plurality of actuatable fins so as to traverse the body of water from a first location to a second location; and
    maintaining a substantially constant density of the untethered autonomous apparatus during the traversing of the body of water.

22. A method according to claim 21 wherein the first location is at or near a water surface and the second location is a predetermined location at or near a floor of the body of water, and wherein the untethered autonomous apparatus is substantially negatively buoyant such that the untethered autonomous apparatus falls through the body of water towards the floor of the body of water.

23. A method according to claim 22 wherein the traversal through the body of water is performed primarily by converting initial potential energy of the untethered autonomous apparatus into kinetic energy.

24. A method according to claim 21 wherein the first location is at or near a floor of the body of water and the second location is at or near a water surface, and wherein the untethered autonomous apparatus is substantially positively buoyant such that the untethered autonomous apparatus rises through the body of water toward the surface of the body of water.

25. A method according to claim 24 further comprising releasing, at the first location, one or more high-density members from the untethered autonomous apparatus thereby causing the untethered autonomous apparatus to change from substantially negatively buoyant to substantially positively buoyant.

26. A method according to claim 21 wherein the perceiving includes communicating with a device that monitors a direction and/or location of the untethered autonomous apparatus.

27. A method according to claim 26 wherein the device that monitors a direction and/or location of the untethered autonomous apparatus is located on the surface of the body of water.

28. A method according to claim 27 wherein the perceiving further includes transmitting an acoustic pulse from the untethered autonomous apparatus which is detectable by the device, and wherein the device forms part of an underwater acoustic positioning system.

29. A method according to claim 28 wherein the underwater acoustic positioning system is of a type selected from a group consisting of: long-baseline, ultra-short-baseline, super short baseline, short baseline, and GPS intelligent buoys.

30. A method according to claim 21 further comprising autonomously delivering equipment to the second location on a floor of the body of water.

31. A method according to claim 21 further comprising making electromagnetic measurements at or near a floor of the body of water with the untethered autonomous apparatus.

32. A method of concurrently traversing a body of water with a plurality of untethered autonomous apparatuses comprising concurrently carrying out the method according to claim 21 for the plurality of untethered autonomous apparatuses.

33. A method according to claim 32 wherein the second positions associated with each of the untethered autonomous apparatuses forms a grid pattern on a floor of the body of water.

34. A method for traversing a body of water with an untethered autonomous apparatus comprising:

placing the untethered autonomous apparatus in the body of water;

perceiving navigation information by the untethered autonomous apparatus using a perception system inside an enclosure module which includes a camera and a processing system adapted to aid in navigation of the untethered autonomous apparatus;

steering the untethered autonomous apparatus in part using the navigation information so as to traverse the body of water from a first location to a second location wherein the traversal through the body of water is performed primarily by converting initial potential energy of the untethered autonomous apparatus into kinetic energy.

35. A method according to claim 34 wherein the traversal does not rely on propellers movement though the body of water.

36. A method according to claim 34 further comprising maintaining a substantially constant density of the untethered autonomous apparatus during the traversing of the body of water.

37. A method according to claim 34 wherein the first location is at or near a water surface and the second location is a predetermined location at or near a floor of the body of water, and wherein the untethered autonomous apparatus is substantially negatively buoyant such that the untethered autonomous apparatus falls through the body of water towards the floor of the body of water.

38. A method according to claim 34 wherein the perceiving includes communicating with a device that monitors a direction and/or location of the untethered autonomous apparatus.

39. A method according to claim 38 wherein the perceiving further includes transmitting an acoustic pulse from the untethered autonomous apparatus which is detectable by the device, and wherein the device forms part of an underwater acoustic positioning system.

40. A method according to claim 39 wherein the underwater acoustic positioning system is of a type selected from a group consisting of: long-baseline, ultra-short-baseline, super short baseline, short baseline, and GPS intelligent buoys.

* * * * *